March 31, 1953 C. M. HATHAWAY 2,633,404
ENGINE DATA RECORDER
Filed April 22, 1946 3 Sheets-Sheet 1

INVENTOR.
Claude M. Hathaway
Moore, Olson and Trexler
attys.

INVENTOR.
Claude M. Hathaway

March 31, 1953 — C. M. HATHAWAY — 2,633,404
ENGINE DATA RECORDER
Filed April 22, 1946 — 3 Sheets-Sheet 3

INVENTOR.
Claude M. Hathaway
By: Moore, Olsen & Treder
attys.

Patented Mar. 31, 1953

2,633,404

UNITED STATES PATENT OFFICE 2,633,404

ENGINE DATA RECORDER

Claude M. Hathaway, Denver, Colo.

Application April 22, 1946, Serial No. 663,895

3 Claims. (Cl. 346—134)

1

The present invention relates to data recorders and more particularly to a data recorder for an internal combustion engine.

In the operation of certain commercial vehicles such as aircraft, trucks, and busses, it would be desirable to have a record of the total operation of the engine so that the engine might be over-hauled whenever the engine has been used a certain amount. Under the present procedure it is customary to over-haul aircraft engines at the end of an estimated number of hours of use. In the operation of busses and trucks the engine is over-hauled at certain time intervals or on the basis of certain mileage.

It is quite apparent that such arbitrary plan for determining when an engine should be over-hauled does not take into account the varying operating conditions which have been encountered which of course make a great deal of difference in the amount of wear which has taken place. Over-hauling of engines of course is primarily for the purpose of checking the operation and for making necessary adjustments and replacements to compensate for a certain amount of wear. If an engine does not show as much wear as has been expected, it nevertheless is necessary to complete the over-hauling job which otherwise might have been deferred. Thus unnecessary labor and expense is involved.

In the operation of aircraft, it furthermore would be desirable to have certain data relative to the operation of the engines whereby periodic checks could readily be obtained as well as obtaining the necessary data for determining when an engine should be over-hauled. The periodic data of course would be of great value in determining any contributing factors to failure of proper operation during flight of the aircraft.

It is, therefore, an object of the present invention to provide an improved data recorder which will indicate the total elapsed time of operation.

It is a further object of the present invention to provide an improved data recorder which will make a record at a constant speed whenever the engine is running.

A still further object of the present invention is to provide an improved engine data recorder for recording a plurality of factors such as engine speed, manifold pressure, and other operating conditions.

Still another object of the present invention is to provide in a data recorder an improved record carriage which will facilitate obtaining the record and reloading the recorder.

A still further object of the present invention is to provide in a data recorder an improved gear arrangement for interconnecting the chart record carriage with the remaining record apparatus.

Other and further objects of the present invention subsequently will become apparent by reference to the following description taken in conjunction with the accompanying drawing wherein Figure 1 is an exterior or front view of an engine data recorder constructed in accordance with the present invention;

In accordance with the present invention a data recorder particularly suited for obtaining data in conjunction with the operation of an internal combustion engine is provided which will give an indication of the total time of operation of the motor and which will provide a record of various factors such as engine speed, manifold pressure, and other factors as for example the time of operation of the water injection apparatus.

Figure 1:
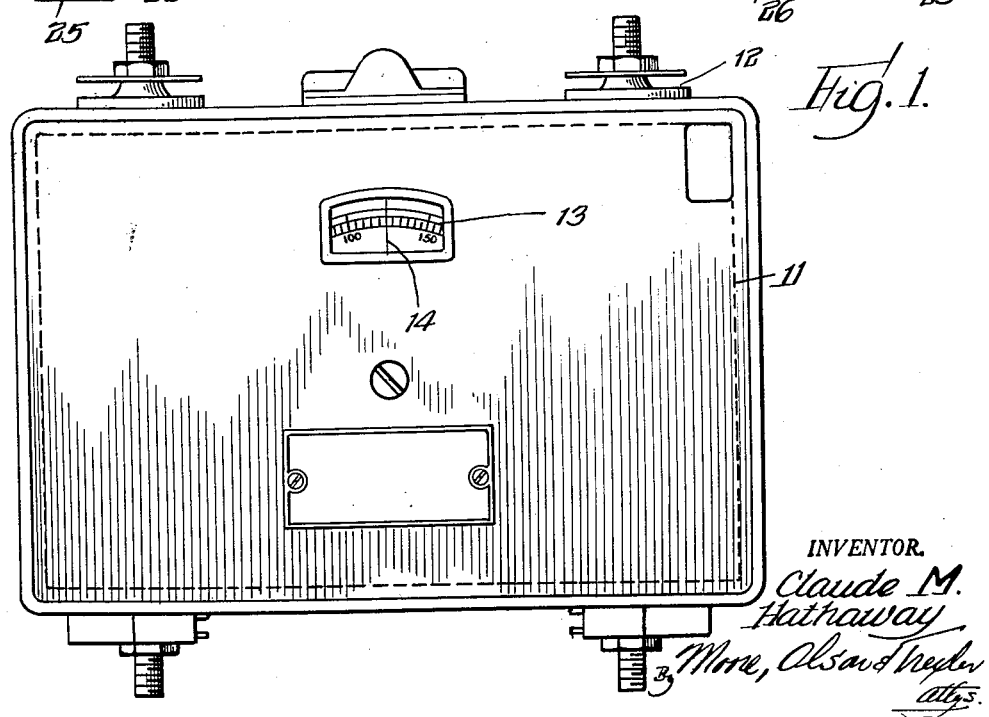

Figure 1 shows an engine data recorder embodying the present invention having a casing 11 which is supported from suitable shock mountings 12. The front of the casing or cover is provided with a window opening 13 for observation of a total time indicating dial 14. Immediately in back of the dial 14, there is located the chart record carriage which is clearly shown in Figure 2. The chart record carriage includes a frame having end members 15 and 16 interconnected by two back member 17 and 18. The end members 15 and 16 are pivotally mounted on side members 19 and 21 located adjacent the bottom corner of the cover 22. The cover 22 has a flange 23 which fits around the main housing 24 and is readily seen from Figure 3. At the bottom edge the cover 22 has two half hinge portions 25 and 26 for cooperation with similar hinge portions 27 and 28 shown in Figure 4. The cover 22 adjacent its top is provided with a retaining spring 29 which engages the upper transverse back wall member 18 of the chart carriage frame. Thus in order to obtain access to the back side of the chart carriage frame it is only necessary to depress the spring 29 to release the carriage so that it may be moved forwardly about the pivotal connections 19 and 21. Adjacent the lower portion of the chart carriage frame, there is located the record material roller 31 having bearing portions 32 and 33. The roller 31 adjacent one end carries a knurled wheel 34 for manually tightening the supply of material on the roll. A record takeup roller 35 is provided with bearing portions 36 and 37 mounted in the end walls 15 and 16. The roller 35 is also provided with a gear 38 which meshes with an idler gear 39 suitably mounted on the end wall 15. Record material from one of the rollers is passed over an upper roller and then returned to the other of the rollers. This upper roller 41 is provided with suitable bearing members 42 and 43 which engage the end walls. The roller 41 adjacent each of its extremities is provided with sets of sprockets 44 and 45 for engaging suitable holes in the record material to assure constant travel speed of the record material past the recording styli. The drum 41 carries at one end a gear 46 which meshes with a gear 39. The drum 45 at its other end carries a gear 47 which engages an idler gear 48 which in turn engages a driving gear 49. The driving gear 49 is mounted on a shaft 51 which carries adjacent its other end a worm gear 52. The worm gear 52 is arranged to engage the toothed periphery 53 of the indicator dial 14.

Figure 3:
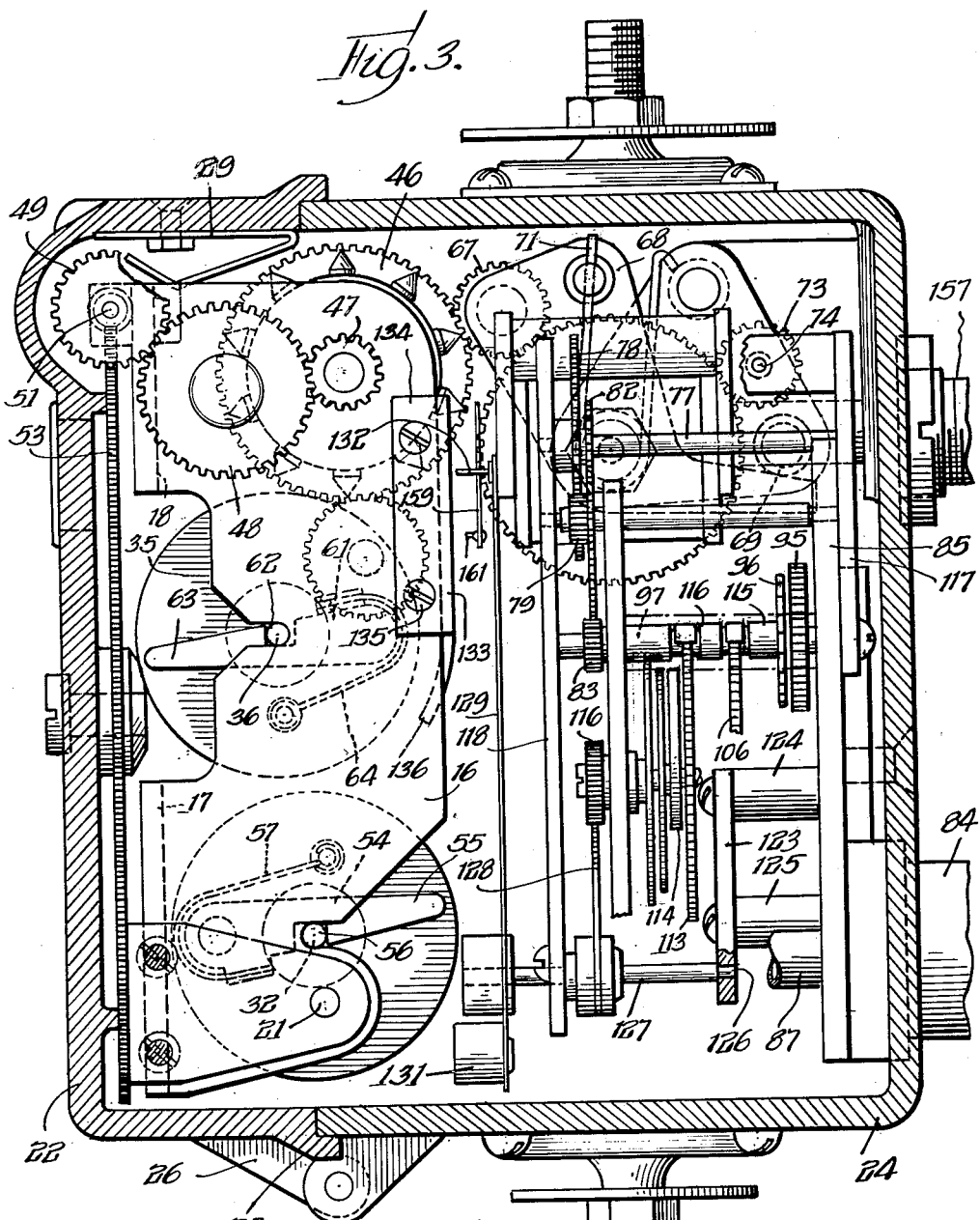
Figure 3 is a right end view of the apparatus shown in Figure 1 as seen immediately beneath the right end wall.

Each end of the roller 31 is secured in position by a spring biased latch such as the one illustrated in Figure 3. This latch includes a pivoted lever 54 having a finger portion 55 so that the lever may be disengaged from the journal or stud 32. The lever 54 is provided with a notch 56 which engages the stud 32 to hold it in position. The lever is biased toward latching position by a spring 57. A similar spring biased lever 58 is provided at the other end of the roller 31. The take-up roller 35 is also latched in position by a similar arrangement comprising the latching levers 59 and 61, the lever 61 being shown in Figure 3. The lever 61 has a notch 62 and a finger portion 63 and is spring biased by a spring 64.

In order that the record material be tightly wound on the take-up reel 35, the gear 38 is attached to the bearing shaft member 37 which extends through a sleeve 65 having an outer flange 66. The sleeve 65 is secured to the roller 35 by suitable fastening means such as a set screw.

The gear 38 is connected to a disk 40 which is provided with a friction plate washer or surface 50 arranged to engage the flange 66 of the sleeve 65. The friction surface 50 is retained in engagement with the flange 66 by means of a spring 60 interposed between the sleeve 65 and one end of the shaft 37.

The gear 46 of the record carriage assembly is arranged to engage a gear 67 which is mounted on a bell crank 68. The bell crank 68 is limited in its forward movement by a stud 69. The bell crank 68 is spring biased forwardly by a spring 71. The gear 67 is an idler gear which engages a larger gear 72 which in turn engages a gear 73 mounted on a shaft 74.

The shaft 74 carries a gear 75 which engages a gear 76 mounted on a shaft 77 carrying a larger gear 78. The gear 78 is engaged by a gear 79 mounted on a shaft 81 which carries a gear 82.

The gear 82 is driven by a gear 83 which is connected to a chronometer mechanism. The chronometer mechanism is driven from a tachometer shaft connection 84.

Figure 5:
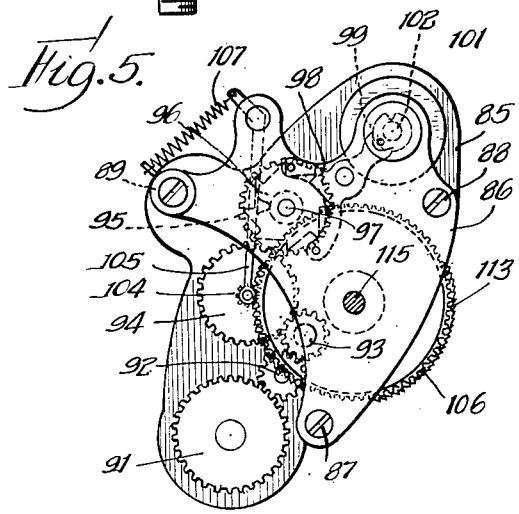
Figures 5 and 6 are top and side views respectively of a portion of a chronometer mechanism employed to drive the record chart and to provide a record of the engine speed.
Figure 6:
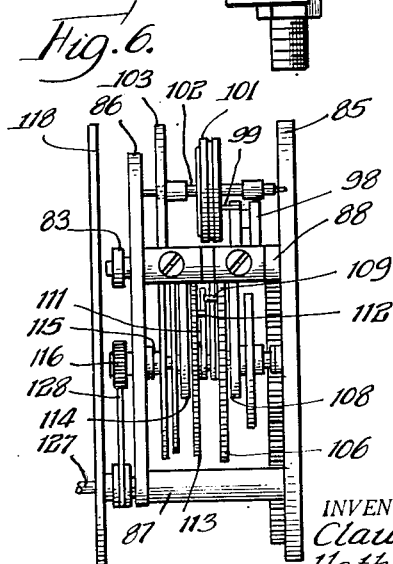

The tachometer mechanism which drives the gear 83 comprises a device which is commercially available and which has been modified so as to perform the required operations in the present invention. This mechanism consists of a clock work mounted between a lower plate 85 and an upper plate 86 shown in Figures 5 and 6. The two plates 85 and 86 are held in spaced relation by a plurality of studs 87, 88 and 89. The tachometer connection 84 drives a gear 91 which meshes with an idler gear 92 connected to another idler gear 93. The two idler gears 92 and 93 are mounted on a common member not shown so that dependent upon the direction of rotation of the gear 91, a driven gear 94 will always be driven in the same direction. If the gear 91 moves in a counter-clockwise direction, the force against the idler gear 92 will be sufficient to throw the other idler gear 94 out of engagement with the gear 94 and to force the gear 92 directly into engagement with this gear. The position shown in Figure 5 illustrates the position obtained when the tachometer gear 91 is moved in a clockwise direction.

The gear 94 engages a gear 95 which by means of a ratchet connection not shown drives an escapement wheel 96. The escapement wheel 96 is mounted on a shaft 97 which carries the gear 83.

The escapement wheel 96 is engaged by the escapement lever or arm 98 which engages the balance staff pin 99 secured to the balance wheel 101. The balance staff 102 which carries the balance wheel 101 is provided with a hair spring 103.

The gear 97 frictionally engages a shaft which carries a gear 104 having its upper end connected to an arm 105 arranged to be moved periodically in and out so as to engage and disengage a winding gear 106. The arm 105 is biased in a direction tending to keep the gear 104 in engagement with the gear 106 by means of a spring 107. The gear 106 is connected to a spring 108 shown in Figure 6. The gear 106 carries a stud or pin 109 which engages a lever 111 which in turn engages a stud 112 which is mounted on a ratchet wheel 113. The ratchet wheel is secured to a spring 114 which tends to bias the ratchet wheel toward return position. The ratchet wheel 113 is arranged to be released by a pawl which is actuated periodically by suitable cam surfaces 115 and 116 on the shaft 97 shown in Figure 3. The winding gear wheel 106 is arranged to store energy in the clock spring 108. The ratchet wheel is arranged to be released so that energy stored in the spring 108 may be used to drive the escapement at a constant speed. The ratchet wheel 113 by virtue of the action of the cam 116 periodically returns toward its original position thereby moving the shaft 115 to which it is attached. The shaft 115 in accordance with the invention is fitted with a gear 116. The motion of this gear 116 by virtue of the operation of the tachometer mechanism will be proportional to the speed of operation of the tachometer shaft.

Figure 4:
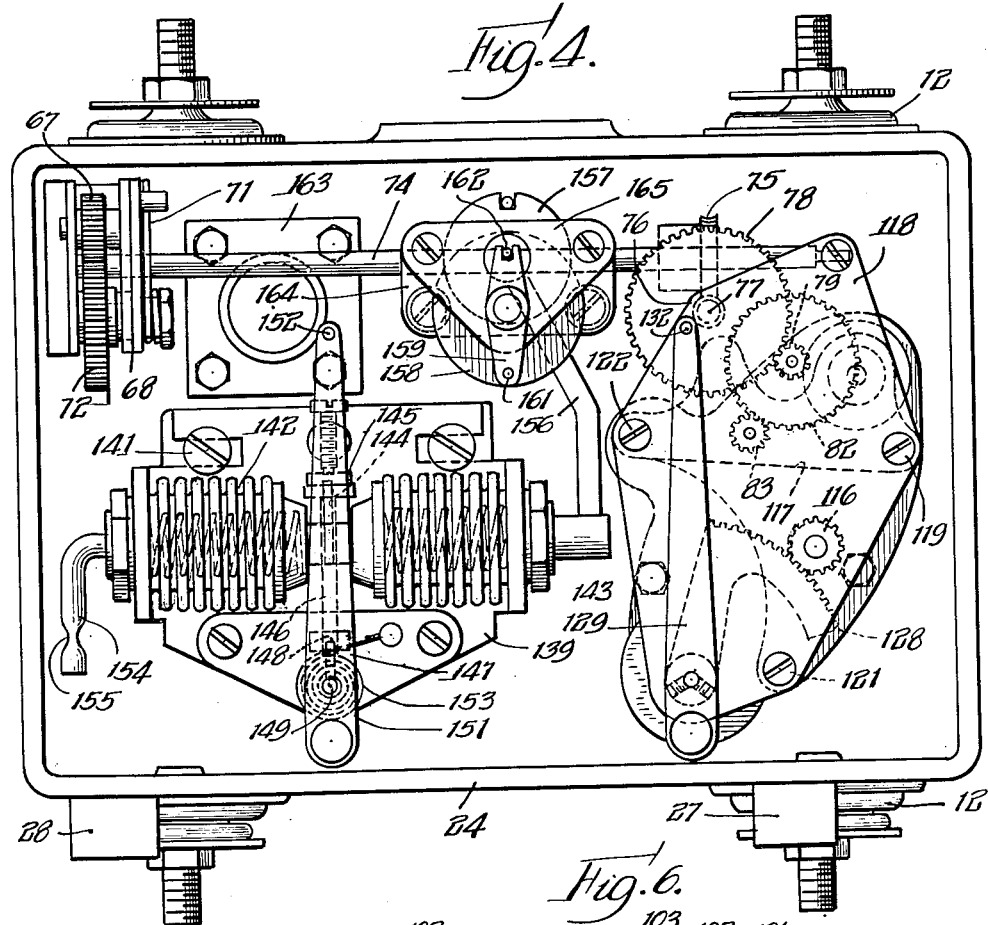
Figure 4 is a view of the interior as seen without the cover.

In order to properly support the additional gears and shafts such as the shaft 76, the bottom plate 85 is provided with an auxiliary extension plate 117 shown in Figures 3 and 4. An auxiliary top plate 118 is spaced from the top plate 86 by a plurality of studs located at 119, 121 and 122 shown in Figure 4. A dog leg plate 123 is supported from the bottom plate 85 by a pair of studs 124 and 125. The outer extremity of the dog leg plate 123 has an opening therein which serves as a bearing 126 for one extremity of a shaft 127 which carries a gear sector 128 which engages the gear 116. The shaft 127 extends through the auxiliary plate 118 and carries a lever 129 provided adjacent its bottom end with a counterbalance 131. The lever 129 at its upper end is provided with a marking stylus 132.

The chronometric tachometer element is used therefore to provide the tachometer recording movement by virtue of actuation of the stylus 132 of the lever 129. Due to the fact that the clock mechanism shown in Figures 5 and 6 has an escapement which runs at a constant speed due to the energy stored in the spring 108, the gear 83 will operate continuously regardless of the rate at which the tachometer cable turns. The escapement measures off equal periods of time and the periodic actuation of the ratchet wheel automatically measures the advance of the tachometer cable per unit of time. This is obtained by the provision of the gear 116 which engages the gear sector 128. The gear sector 128 has been provided to reduce the motion of the stylus to the desired angle since a direct connection between the shaft 115 and the lever arm 129 would provide a motion greater than desired. The operation of the mechanism shown in Figures 5 and 6 therefore insures a constant driving speed for the record chart as long as the engine is running. This driving power is obtained from the gear 83 which transmits power through suitable gears to the shaft 74 which in turn through suitable gears transmits power to the gear 46 of the record chart driving roller 41.

The pivoted bell crank support of the gear 67 permits displacement of the gear when the cover is replaced on the casing so that any damage to the gears is avoided which might otherwise occur if the gears did not occupy positions where they would readily mesh. As soon as power is supplied to the shaft 74, the gear 67 rotates sufficiently so as to mesh with the gear 46.

Figure 2:
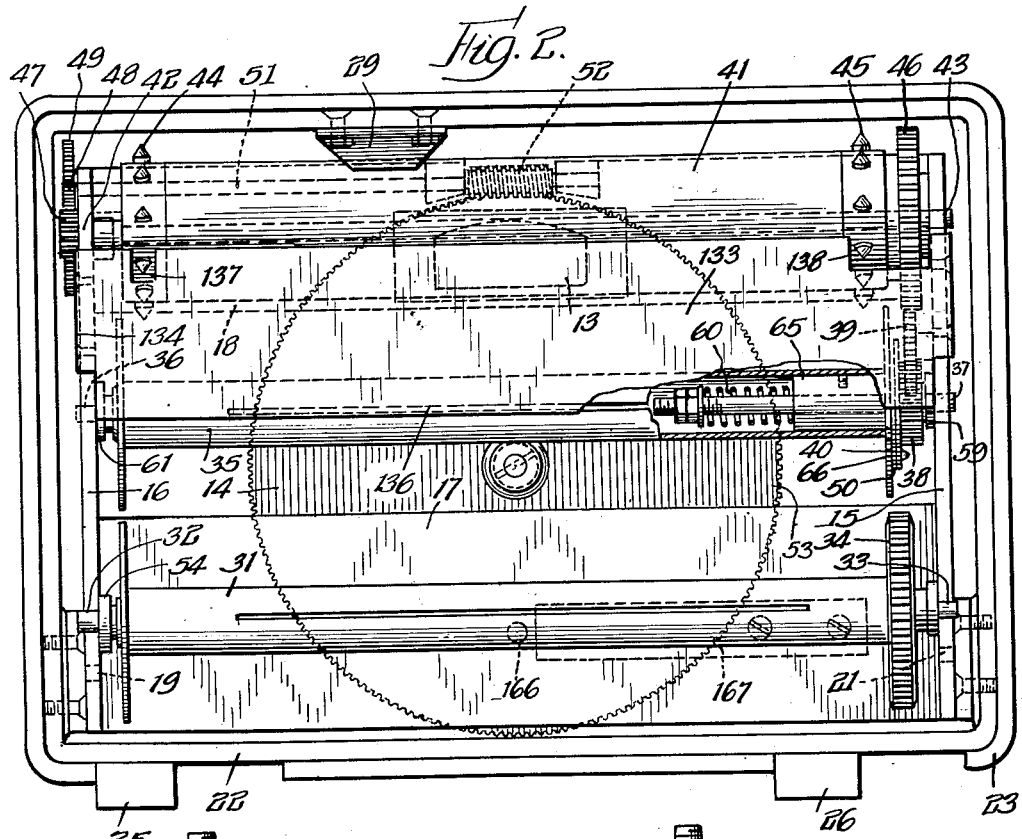
Figure 2 is an inside view of the cover of the recorder shown in Figure 1 as seen immediately beneath the front panel and operation time indicator.

The record material moves from the reel or spool 31 over a plate 133 which is secured to the end walls 15 and 16 of the record chart carriage by over-turned ends 134 secured in position by suitable screws 135. The plate 133 has an inwardly curved depending portion 136 so that the chart material is readily guided over the plane surfaces of the plate 133. At the upper edge of the plate 133 as seen in Figure 2 suitable notches 137 and 138 are provided to permit the sprockets 44 and 45 and the gear 46 to clear the plate. The plate 133 serves as a surface to hold the paper while the styli of the various instruments engage the paper to make a record.

In addition to recording the speed of the mechanism connected to the tachometer shaft 84 by the stylus 132, records are also made of other factors such as the manifold pressure and the off and on period of some other factor such as the water injection to the carburetor or manifold.

Figure 4 shows a manifold pressure recording device which is provided with a base or supporting plate 139 secured to the casing or housing 24 by suitable screws 141. Mounted on the plate 139 is a pair of bellows 142 which are spring biased toward center position by suitably arranged internal springs 143. Between the two bellows 142, there is mounted a stud shaft 144 which engages a suitable notch in a pivoted lever 145. The pivoted lever 145 is connected to a shaft 146 which is provided adjacent its other extremity with another lever 147. The lever 147 engages a stud or pin 148 in a shaft 149 to which is secured a counter-balance recording lever 151 which has at its upper extremity a recording stylus 152. The lever 147 is formed of bi-metallic material so as to introduce temperature compensation in the interconnecting linkage. A marking lever 151 is biased toward a neutral vertical position as shown in Figure 4 by means of a hair spring 153. The one bellows in the left of Figure 4 is provided with a tube 154 by which that bellows is evacuated and sealed by a suitable pinch seal 155. The other bellows to the right in Figure 4 is provided with a tube 156 which is connected to a suitable conduit 157 extending through the rear of the housing 24 which is shown in Figure 3.

A solenoid marker is provided for recording some other action such as the on and off periods of water injection apparatus for the engine. A solenoid 158 is provided with a suitable core resiliently biased away from the center of the solenoid 158. When the solenoid 158 is energized, the core is attracted toward the center of the coil so as to move forwardly a marking lever 159 carrying at the outer extremity a marking stylus 161. The marking lever 159 adjacent its upper extremity has a notch for receiving a guide pin 162 so that the marking stylus 161 is not angularly displaced. The solenoid 158 is energized from a suitable electrical connection provided by a connector 163 shown in Figure 4 and which extends to the rear of the casing 24. The solenoid marker is provided with a base 164 which is suitably secured to the casing 24. A top plate 165 is also provided for the other end of the solenoid coil 158.

Figure 7:
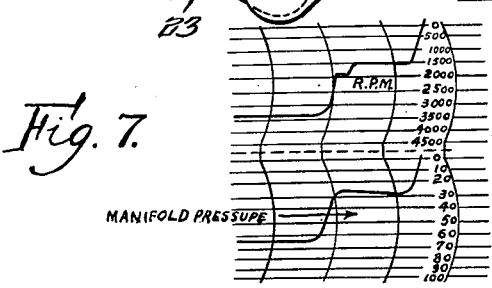
Figure 7 shows the type of record produced by the recorder.

Whenever the engine with which the data recorder is associated is started, the tachometer connection to the coupling 84 serves to rotate the gear 85 thereby bringing into constant speed operation, the record chart carriage and record material thereon. It has been found convenient to use for recording material a steam engine indicator chart which is coated with a light abrasive surface whereby marking is accomplished by means of soft metal styli. The type of record thus produced is illustrated in Figure 7. Thus the styli 132, 152, and 161 are of this soft metal so as to produce a mark upon the record chart material. Simultaneously with the starting and stopping of the record chart, the total elapsed time indicator 53 is actuated. The indicator is so arranged as to provide a total operation of six hundred hours. At the end of six hundred hours a stud 166 engages a stop 167 mounted on the inside of the cover 22. The recording apparatus thereafter must be re-set in order to produce a further record. The chart driver mechanism in one instance employs a chart fifty feet in length and about four inches in width so that the travel of the chart may continue at a constant speed while the engine is running and therefore will be proportional to the total engine hours. The chart in such case therefore travels at a rate of about one inch per hour.

From the foregoing it will be seen that there has been provided a data recorder which has a cover unit which is readily removable so as to provide convenient access to the record data chart even though the main casing may be mounted in a relatively inaccessible place, as is often the case in aircraft. It furthermore will be appreciated that for fleets of vehicles in the case of busses, trucks, and aircraft, a cover may be removed from the unit and a new cover substituted whereupon all the record data may be removed and analyzed without delaying further operation of the craft or vehicle. The quick removal of the cover together with the pivoted spring retained chart carriage furthermore facilitates a quick removal of the chart and rapid insertion of new record material. Since the record material may be inserted in any convenient place regardless of how inaccessible the main casing is, it will be appreciated that there has been provided an arrangement whereby all the essential operating data may be obtained.

While for the purpose of describing and illustrating the present invention, a preferred embodiment has been disclosed in the drawings, it is to be understood that the invention is not to be limited thereby since such variations and re-arrangements are contemplated in the apparatus and in the components thereof as may be commensurate with the spirit and scope of the invention set forth in the following claims.

This invention is hereby claimed as follows:

1. An automatic recording apparatus comprising a body and a removable record chart carriage including a driven gear, means mounted in said body for driving said driven gear at a constant speed including a driving gear and a spring biased pivotally mounted idler gear engaging said driving gear so that said carriage may be moved to recording position irrespective of the relative positions of the teeth of said driven and idler gears.

2. An automatic recording apparatus comprising a body and a record chart carriage including a driven gear, means mounted in said body for driving said driven gear including a driving gear and a spring biased idler gear engaging said driving gear, said idler gear being pivotally mounted on a member having its pivotal axis coincident with the axis of said driving gear, said record chart carriage having a record supply roller, a record receiving roller, and driving means interconnecting said driven gear with said record receiving roller including a slip clutch.

3. An automatic recording apparatus comprising a body and a removable record chart carriage having a driven gear, means mounted in said body for driving said driven gear including an idler gear and a driving gear in engagement therewith, said idler gear being mounted on a member arranged to pivot about the axis of said driving gear, spring means biasing said member toward a certain position whereby said carriage may be moved to recording position irrespective of the relative positions of the teeth of said driven and idler gears.

CLAUDE M. HATHAWAY.

REFERENCES CITED

The following references are of record in the file of this patent:

UNITED STATES PATENTS

| Number | Name | Date |
|---|---|---|
| 443,360 | Edson | Dec. 23, 1890 |
| 625,537 | Bristol | May 23, 1899 |
| 961,288 | Cullman | June 14, 1910 |
| 982,021 | Renfro | Jan. 17, 1911 |
| 1,132,400 | Simpson | Mar. 16, 1915 |
| 1,236,911 | Cole | Aug. 14, 1917 |
| 1,316,657 | White et al. | Sept. 23, 1919 |
| 1,385,342 | Bruhn | July 19, 1921 |
| 1,455,806 | Pausch | May 22, 1923 |
| 1,548,960 | Stuber et al. | Aug. 11, 1925 |
| 1,563,382 | Legg | Dec. 1, 1925 |
| 1,587,639 | Fleischer | June 28, 1926 |
| 1,723,228 | Burnham | Aug. 6, 1929 |
| 1,847,913 | Blanchard | Mar. 1, 1932 |
| 1,886,844 | Spitzglass | Nov. 8, 1932 |
| 2,069,152 | Kohler | Jan. 26, 1937 |
| 2,214,522 | Chappell et al. | Sept. 10, 1940 |
| 2,341,118 | Rodanet | Feb. 8, 1944 |
| 2,391,765 | Artzt | Dec. 25, 1945 |
| 2,398,133 | Cronholm | Apr. 9, 1946 |